United States Patent [19]

Yanagishima et al.

[11] 4,224,609
[45] * Sep. 23, 1980

[54] DRIVING ASSURANCE SYSTEM FOR WHEELED VEHICLES

[75] Inventors: Takayuki Yanagishima; Akira Matsumura, both of Yokohama, Japan

[73] Assignee: Nissan Motor Company, Limited, Yokohama, Japan

[*] Notice: The portion of the term of this patent subsequent to Aug. 1, 1995, has been disclaimed.

[21] Appl. No.: 904,234

[22] Filed: May 9, 1978

Related U.S. Application Data

[62] Division of Ser. No. 715,827, Aug. 19, 1976, Pat. No. 4,104,621.

[30] Foreign Application Priority Data

Aug. 20, 1975 [JP] Japan .................................. 50-101610
Sep. 3, 1975 [JP] Japan .................................. 50-107453

[51] Int. Cl.² ...................... G08B 21/00; B60R 27/00
[52] U.S. Cl. ........................................ 340/576; 180/272
[58] Field of Search .................... 340/576; 180/99, 272

[56] References Cited

U.S. PATENT DOCUMENTS

| 3,106,981 | 10/1963 | Chakiris | 340/576 |
| 3,980,999 | 9/1976 | Nishioka et al. | 180/99 |
| 4,005,398 | 1/1977 | Inoue et al. | 340/576 |
| 4,007,357 | 2/1977 | Yanagishima | 180/99 |
| 4,017,843 | 4/1977 | Yanagishima | 340/576 |
| 4,031,527 | 6/1977 | Yanagishima et al. | 347/576 |
| 4,104,621 | 8/1978 | Yanagishima et al. | 340/576 |

FOREIGN PATENT DOCUMENTS

| 966723 | 8/1964 | United Kingdom | 340/576 |
| 1091541 | 11/1967 | United Kingdom | 340/576 |
| 1410465 | 10/1975 | United Kingdom | 340/576 |

Primary Examiner—Glen R. Swann, III
Attorney, Agent, or Firm—Robert E. Burns; Emmanuel J. Lobato; Bruce L. Adams

[57] ABSTRACT

A driving assurance system for an automotive vehicle includes a steering detector which generates an electrical pulse in response to each angular movement of the steering wheel exceeding an arcuate extent less than 10°. A monostable multivibrator is connected to the steering detector to generate an output pulse in response to the first one of such pulses generated by a single steering operation so that the output from the miltivibrator may represent a single steering operation. The output from the multivibrator is counted for a predetermined period to determine the state of the driver to operate a warning signal when he becomes incapacitated.

4 Claims, 5 Drawing Figures

DRIVING ASSURANCE SYSTEM FOR WHEELED VEHICLES

This is a divisional of application Ser. No. 715,827, filed Aug. 19, 1976, now U.S. Pat. No. 4,104,621.

BACKGROUND OF THE INVENTION

The present invention relates to an improved driving assurance system.

Systems utilizing the absence of a constant slight oscillatory movement of the steering wheel of an automotive vehicle to operate a warning signal are well known in the art. The prior art systems usually employ an arcuate light shield having a series of apertures arranged at a predetermined angular spacing. The shield is mounted on the steering wheel of a vehicle for rotation therewith. A light source and a photoelectric cell are stationarily mounted in opposed relation with the light shield therebetween so that by rotation of the steering wheel a number of electrical pulses will be generated in response to the passing and intercepting of the light by the light shield. However, the arcuate extent of steering movement varies widely depending upon the driver's steering behavior, the vehicle's driving performance and the roadway conditions. Therefore, a larger number of pulses will be generated by a single steering operation when such operation exceeds an arcuate extent much greater than the spacing between successive ones of the apertures of the light shield, and thus does not accurately represent the actual steering operation.

SUMMARY OF THE INVENTION

Therefore, an object of the invention is to provide an improved driving assurance system which comprises a steering detector to generate a signal when the steering movement exceeds an arcuate extent of less than 10° and a monostable multivibrator connected to the steering detector. The period of the monostable multivibrator is chosen at a value which encompasses a plurality of such signals generated by a single steering operation so that the output from the multivibrator may represent a single steering operation.

BRIEF DESCRIPTION OF THE DRAWINGS

The invention will be described by way of examples in conjunction with the accompanying drawings, in which.

DESCRIPTION OF THE PREFERRED EMBODIMENT

Figure 1:
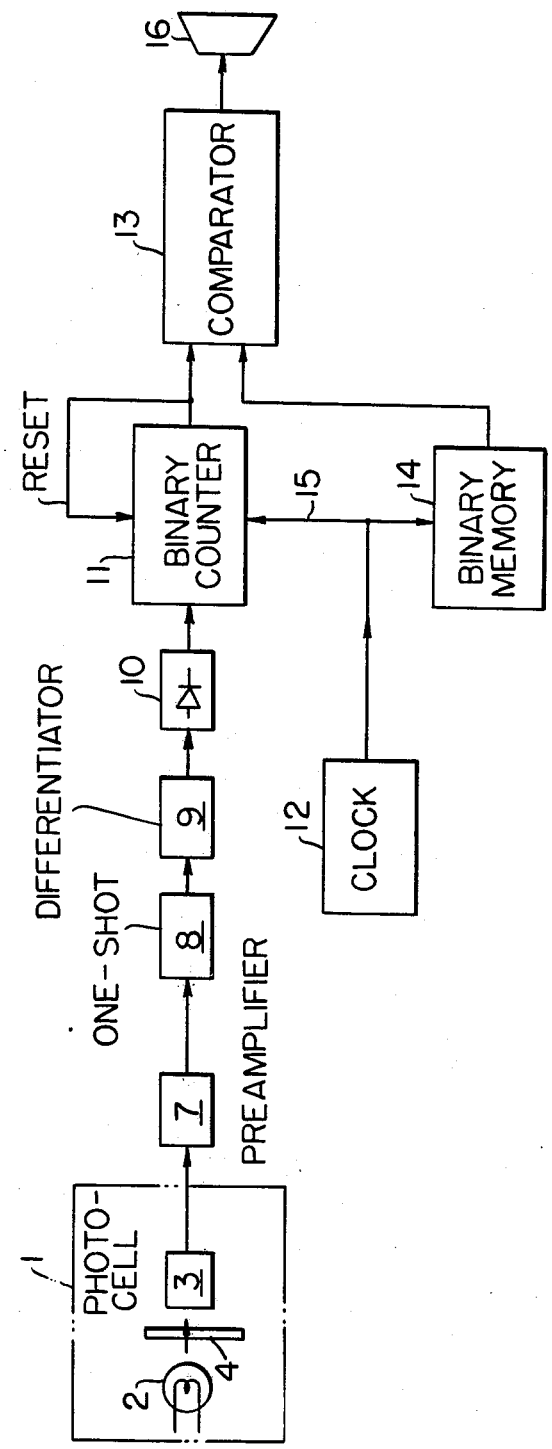
FIG. 1 is a block diagram of a first embodiment of the invention.
Figure 2:
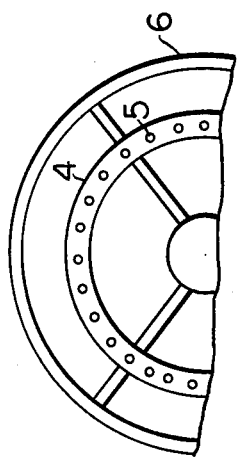
FIG. 2 is a fragmentary view of a steering detector employed in the invention.

Referring now to FIGS. 1 and 2, there is shown an embodiment of the invention. The driving assurance system comprises a steering movement detector 1 which includes a lamp 2 and a photocell 3 mounted in opposed relation to each other with an arcuate light shield 4 therebetween. The light shield 4 is provided with a row or sequence of apertures 5 arranged at an angular spacing of less than 10° (2° in this case) and mounted on the steering wheel 6 of an automotive vehicle for rotation therewith. The photocell is connected to a preamplifier 7 and thence to a monostable multivibrator 8. The output of the monostable multivibrator is connected to a differentiator 9. A rectifying means or diode 10 is coupled to the differentiator output to pass those signals having positive polarity to a binary counter 11. The counter 11 is enabled at constant intervals by clock pulses from a source 12 so as to provide a binary count to its output terminal. The output from the counter is coupled to its reset terminal to clear its contents and also to a first input terminal of a binary comparator 13 to the second input of which is connected the output from a binary memory 14. The binary memory 14 provides a reference binary level for comparison with the counter output and delivers its reference output to the comparator 13 in response to the clock or enable pulses received over a line 15. The comparator 13 produces a warning signal when the binary input at the first terminal is below the input at the second terminal when both counter and memory are enabled. A warning device 16 is connected to the output of the comparator 13 to audibly alert the vehicle driver.

In operation, with a signal being applied, the one-shot multivibrator 8 produces a pulse of the duration of about 1 second. Since a single steering movement exceeding an arcuate extent greater than 2° generates a plurality of pulses from the photocell 3, the multivibrator responds to the first one of the plurality of such pulses and the pulses that occur for the remainder of the duration of the multivibrator 8 are eliminated or cancelled. Since the cancelled pulses have no valid information as to the steering frequency, the output from the multivibrator 8 substantially represents valid information as to the steering frequency or number of steering movements per unit time. The leading edge of the pulse output from the multivibrator 8 is differentiated to produce a narrow width pulse of positive polarity which is passed through the diode 10 to the counter 11. It is appreciated that for each steering oscillatory movement, substantially a single input pulse is applied to the counter 11. During each clock interval, the counter 11 is incremented in response to steering operations and at the end of each clock interval the binary output is delivered to the comparator. If the binary counter output is greater than the reference level, comparator 13 provides no output.

If the driver becomes drowsy or incapacitated, the steering operation ceases and the binary level of the counter 11 falls below the reference level during the clock interval and the comparator 13 produces a warning signal.

Figure 3:
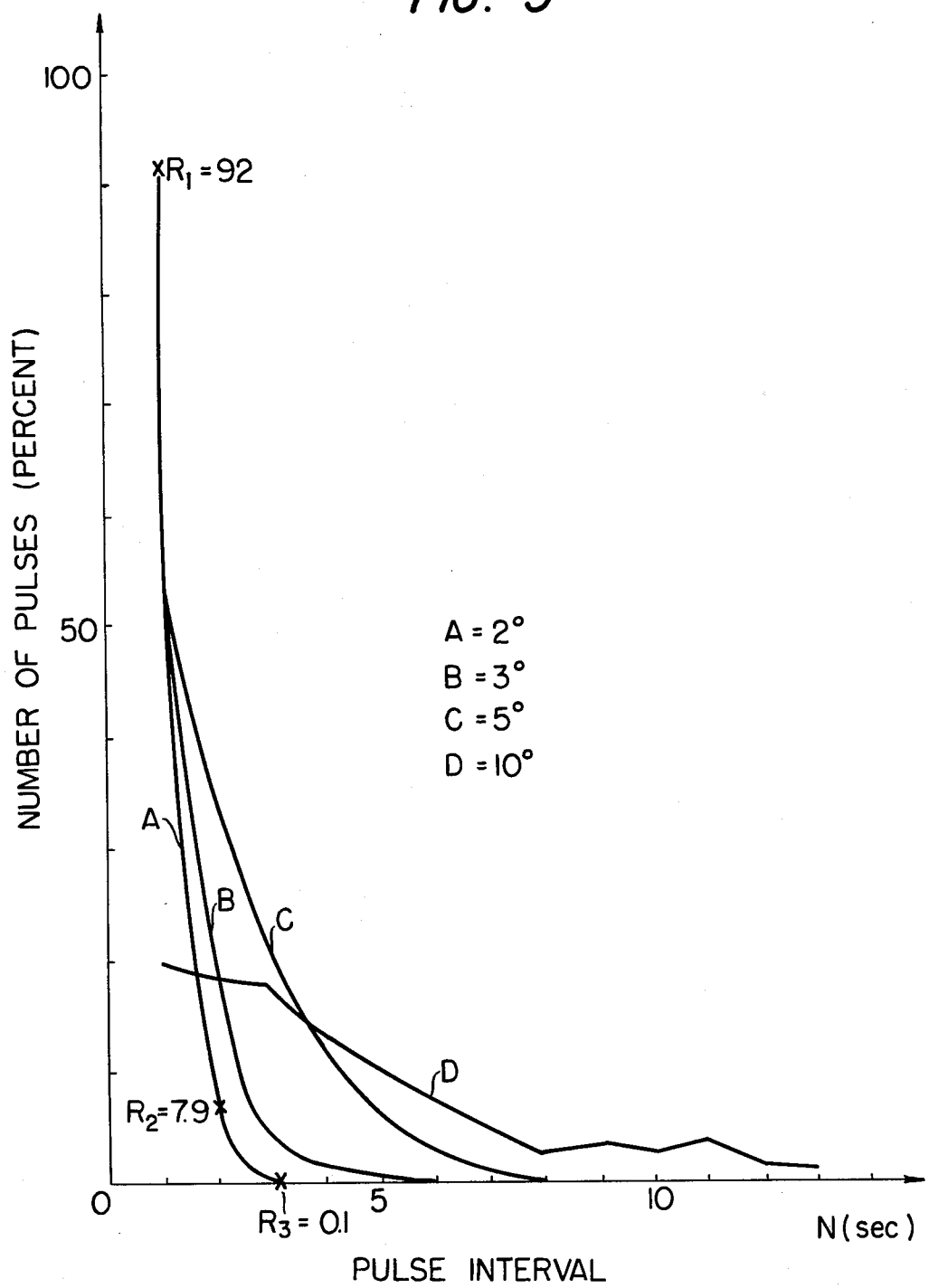
FIG. 3 is a graphical illustration of steering behavior of a driver operating a vehicle on a highway using the steering detector of FIG. 2.

Reference is then made to the result of an experiment which analyzed the steering behavior of a driver operating an automotive vehicle at a speed of 40 kilometers per hour, using the steering detector as constructed in a manner similar to that shown in FIGS. 1 and 2. In FIG. 3 the normalized number of pulses generated from the photocell 3 is plotted on the vertical axis against the interval between successive ones of such pulses for various aperture spacings. Curves A to D are plotted for aperture spacings 2°, 3°, 5° and 10°, respectively. From an examination of curves A to C, it will be understood that the period of multivibrator 8 is preferably from 1 to 2 seconds and that the aperture spacing is preferably be from 2° to 5°.

Considering now the reference number of steering movements per unit time as a measure to determine the time to operate a warning signal. Let T denote the clock interval. By collecting data from curve A at an interval of 1 second, the following equation holds:

$$\sum_{1}^{N} = \frac{R_N}{100} \cdot X \cdot N = T \tag{1}$$

where,

X = the reference number of pulses generated from photocell 3 for the clock interval T,
N = the interval between successive pulses,
$R_N$ = the ratio of number of pulses generated for interval N to the whole number of pulses generated (%), as indicated on the vertical axis of FIG. 1

By substituting the data from FIG. 1 into Equation (1) for T = 60 seconds, the following is obtained:

$$\frac{92 \times 1}{100} X + \frac{7.9 \times 2}{100} X + \frac{0.1 \times 3}{100} X = 60$$

$$X = 56$$

Therefore, the binary memory 14 provides a binary count of 56 for a clock interval of 60 seconds with aperture spacing of 2°, and a 1 second interval for monostable multivibrator 8.

By collecting data from curve A at an interval of 2 seconds, the following equation holds:

$$\sum_{N=1}^{N} = \frac{R_{2N-1} + R_{2N}}{100} X 2N = T \tag{2}$$

In case where T = 60 seconds, the following is obtained:

$$\frac{(92 + 7.9) \times 2}{100} X + \frac{(0.1 + 0) \times 4}{100} X = 60$$

therefore, $$X \approx 29$$

To facilitate discrimination between the normal driving condition and the incapacitated state, it is desirable to provide a reference value of a comparatively large magnitude for a particular clock interval. From the foregoing discussion, it follows that the data be collected at small intervals to generate a large reference value. Therefore, the period of monostable multivibrator 8 is preferably chosen at 1 second for the aperture spacing of 2° and the clock interval of 60 seconds. The angular aperture spacing should be less than 10°, preferably 5°.

Figure 4:
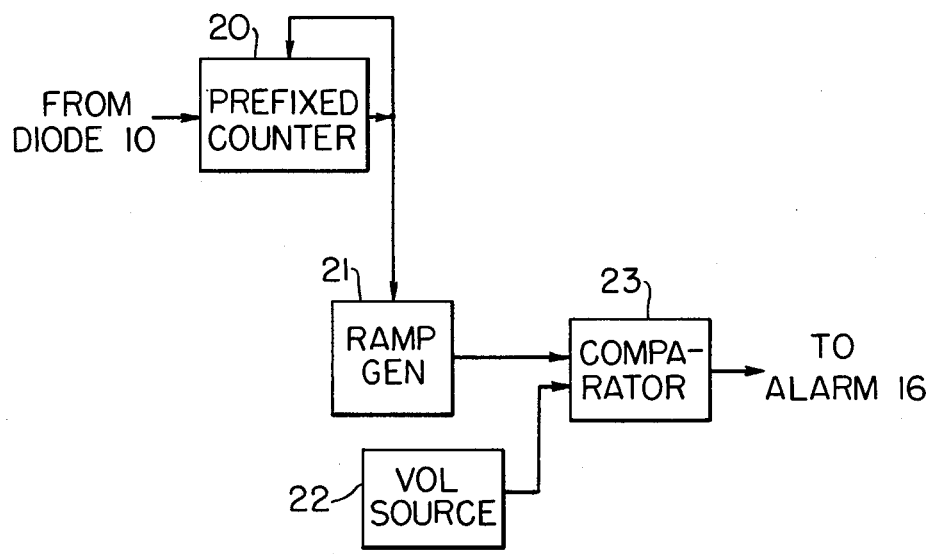
FIG. 4 is a block diagram of a modification of the embodiment of FIG. 1.

In a modification of the embodiment of FIG. 1 shown in FIG. 4, a prefixed counter 20 provides an output upon counting of a predetermined number of input pulses applied thereto from the diode 10 of the previous circuit shown in FIG. 1. An integrator circuit or ramp generator generates a triangular or sawtooth wave voltage in response to the output from the counter 20. The sawtooth wave voltage is applied to a first input of a comparator 23 for comparison with a reference voltage supplied from a voltage source 22. The comparator generates a warning signal when the ramp voltage reaches the reference voltage. When the driver becomes incapacitated, the ramp voltage will reach the reference level before the ramp generator 21 is reset by the output from the counter 20 and operate a warning signal.

Figure 5:
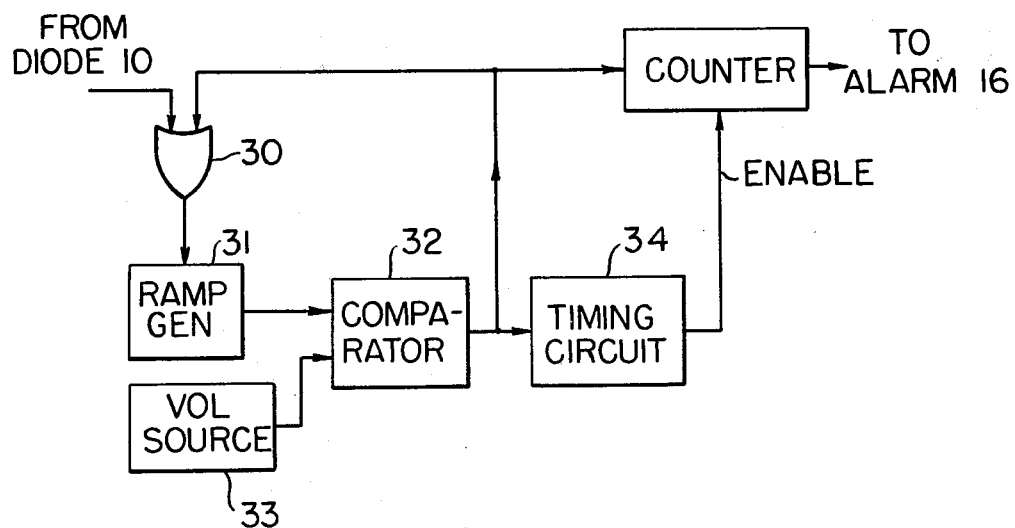
FIG. 5 is a block diagram for a further modification of the embodiment of FIG. 1.

In another modification of the circuit of FIG. 1 shown in FIG. 5, the signal from the diode 10 of the previous circuit is applied to a ramp generator 31 through an OR gate 30 as a trigger signal to generate a sawtooth wave signal which in turn is applied to a comparator 32 for comparison with a reference level supplied from a voltage source 33. The comparator 32 provides an output only when the output from the ramp generator exceeds the reference level. The comparator output is coupled to a timing circuit 34 and to the ramp generator 31 through the OR gate 30 to reset the ramp voltage and also to the input of a counter 35. The timing circuit 34 generates an output pulse of a predetermined duration and applies it to the counter 35 as an enable signal. While enabled, the counter 35 receives the signal from comparator 32 and increments its count in response to the occurrence of the ramp voltage exceeding the reference level and generates a warning signal when a predetermined number of counts is reached.

When the driver becomes drowsy or incapacitated, the number of pulses from the diode 10 decreases and eventually decreases to zero. Since the comparator output is coupled to the ramp generator 31 through a feedback loop, the ramp generator 31 repeatedly produces sawtooth waves and as a result the comparator 32 produces a series of output pulses which increment the counter 35 in order to generate a warning signal.

What is claimed is:

1. A driving assurance system for a wheeled vehicle having a steering wheel, comprising: first means for detecting an angular movement of the steering wheel to generate an electrical pulse for every angular movement exceeding a predetermined value no greater than 10° so that said pulse is generated successively when the angular movement exceeds an integral multiple of said predetermined value, a monostable multivibrator connected to said detecting means to the first one of a series of said generate an output pulse in response to pulses generated by the first means during a continuous steering movement, the period of said monostable multivibrator being greater than the longest interval between successive electrical pulses generated by said first means during a continuous steering movement, and second means for generating a warning signal when the interval between successive ones of said output pulses from said monostable multivibrator exceeds a predetermined value.

2. A driving assurance system as claimed in claim 1, wherein said second means comprises a prefixed counter connected to the output of said monostable multivibrator, a ramp generator connected to the prefixed counter and reset to generate a ramp voltage in response to the output of the prefixed counter, and a comparator for comparing the ramp voltage with a reference voltage to generate a warning signal when said ramp voltage exceeds said reference voltage.

3. A driving assurance system as claimed in claim 1, wherein said second means comprises a ramp generator connected to receive said output pulse and reset to generate a ramp voltage in response to said output pulse, a voltage comparator for comparing the ramp voltage with a reference voltage to provide an output when the ramp voltage exceeds the reference voltage, the output of said comparator being connected to the input of said ramp generator to form a closed loop, said comparator output restting said ramp generator, and wherein said second means further comprises a counter responsive to the output from said voltage comparator to generate an output when a predetermined count is reached.

4. A driving assurance system as claimed in claim 1, wherein said second means comprises means for generating a signal of which the magnitude increases in the absence of said output pulses of said multivibrator and of which the magnitude is reset to a zero value by each of said multivibrator output pulses and means for comparing the magnitude of said signal with a reference value to generate a warning signal when said signal exceeds said reference value.

* * * * *